United States Patent
Yanagisawa

[11] Patent Number: 5,933,294
[45] Date of Patent: Aug. 3, 1999

[54] MAGNETIC HEAD SUPPORTING DEVICE WITH A SUSPENSION MEMBER HAVING AN ARCUATE HOLE AT THE SLIDER SUPPORTING END

[75] Inventor: Masahiro Yanagisawa, Tokyo, Japan

[73] Assignee: NEC Corporation, Tokyo, Japan

[21] Appl. No.: 08/940,379

[22] Filed: Sep. 30, 1997

[30] Foreign Application Priority Data

Sep. 30, 1996 [JP] Japan .................................. 8-259087

[51] Int. Cl.$^6$ .......................................................... G11B 5/48
[52] U.S. Cl. ................................................................ 360/104
[58] Field of Search ............................................. 360/104

[56] References Cited

U.S. PATENT DOCUMENTS

| | | | |
|---|---|---|---|
| 5,519,552 | 5/1996 | Kohira | 360/104 |
| 5,526,205 | 6/1996 | Aoyagi | 360/104 |

FOREIGN PATENT DOCUMENTS

| | | |
|---|---|---|
| 61-122978 | 6/1986 | Japan . |
| 63-144472 | 6/1988 | Japan . |
| 64-62877 | 3/1989 | Japan . |
| 5-114264 | 5/1993 | Japan . |
| 5-303730 | 11/1993 | Japan . |
| 8-129845 | 5/1996 | Japan . |
| 8-227568 | 9/1996 | Japan . |

Primary Examiner—A. J. Heinz
Attorney, Agent, or Firm—Young & Thompson

[57] ABSTRACT

A magnetic head supporting device is provided in which a change in rigidity of a suspension in the case where the suspension is located inside and outside above a surface of a magnetic disk is reduced, thereby suppressing a flexure of the suspension member to suppress the generation of frictional forces, head crashes and the like. In a magnetic head supporting device including a suspension member 12 provided at a first end portion with a slider 11 for a magnetic head and composed of a spring member, a magnetic head arm 13 for holding the other end portion of the suspension member 12, and a linear actuator 14 for biasing the first end portion of the suspension member 12 through the magnetic head arm 13 to be reciprocatingly moved toward a central portion of a magnetic disk 100 above the surface of the magnetic disk 100, an elongated hole 16 having a predetermined width is provided on a centerline that connects the first end portion and the other end portion of the suspension member 12.

5 Claims, 7 Drawing Sheets

MAGNETIC HEAD SUPPORTING DEVICE WITH A SUSPENSION MEMBER HAVING AN ARCUATE HOLE AT THE SLIDER SUPPORTING END

BACKGROUND OF THE INVENTION

The present invention relates to a magnetic head supporting device, and more particularly to a magnetic head supporting device used in a magnetic disk apparatus.

In general, a magnetic disk apparatus (hard disk drive) comprises a support spring (hereinafter referred to as "suspension") for supporting a magnetic head slider (hereinafter simply referred to as "slider") carrying a recording/reproducing element (magnetic head), a magnetic head supporting device having an actuator for moving the support spring in a radial direction, and a magnetic disk medium (hereinafter simply referred to as "medium") for magnetically accumulating information.

The suspension takes an important role for maintaining a followability of a slider to the medium in an air floating state caused by the rotation of the medium and in a seeking operation. The seeking direction changes in accordance with a kind of actuators. A linear actuator moves the slider in parallel with the radial direction of the medium. Also, a rotary actuator moves the slider substantially in the radial direction of the medium about a rotary center axis of the actuator.

FIG. 8 shows the prior art. The piece of prior art shown in FIG. 8 is disclosed in FIG. 4 of Japanese Patent Application Laid-Open No. Hei 1-062877. The prior art system shown in FIG. 8 is provided with a suspension 54 having elongated holes 56 and 57 (formed into an inverted V-shape to be directed to a center of rotation) which holes are not in parallel with a seeking trace direction A (seeking direction). The suspension 54 is held by a linear actuator 52 through a magnetic head arm 53. Also, a slider 55 moves in the radial direction above a magnetic disk 100.

With respect to the suspension 54 of these components, the above-described Japanese Patent Application Laid-Open No. Hei 1-062877 discloses a technique for reducing an amplitude of a primary bending vibration with a structure where the grooves that are not in parallel with the longitudinal direction (i.e., corresponding to the seeking direction in this case) are formed in the interior of the suspension 54.

On the other hand, Japanese Patent Application Laid-Open No. Hei 5-303730 discloses a technique for moderating a rigidity by providing a narrowed portion in the suspension and at the same time enhancing a followability in a slight floating state by miniaturizing the slider portion.

However, when the slider is moved in the seeking direction by the actuator, there is a problem in which the suspension is flexed or a distance between the slider and the medium is varied so that it would be difficult to exactly position the track in place. Then, in some cases, since the slider is brought into contact with the medium due to the flexure of the suspension, there is a fear that a recording/reproducing error occurs or the medium is abraded due to the contact of the recording/reproducing element, resulting in cancellation of the record.

In this case, the larger the rigidity in the seeking direction, the smaller the flexure in the seeking direction of the suspension will become. In particular, as the force of the suspension toward the surface of the medium, i.e., the load is smaller, and the thickness of the spring should be smaller. Accordingly, in such a case, the rigidity becomes low.

In this case, in order to reduce the load without changing the thickness of the spring, it would be sufficient to form grooves or holes in the suspension. However, the above-described elongated holes 56 and 57 shown in FIG. 8 (Japanese Patent Application Laid-Open No. Hei 1-062877) are not in parallel with the seeking direction. For this reason, as a matter of fact, it is difficult to increase the rigidity in the seeking direction (formed into an inverted V-shape to be directed to the direction of the magnetic disk).

In view of the above-noted difficulties, the present inventor has experimentally found that the direction of formation of the elongated holes formed in the suspension has something to do with the rigidity of the suspension.

On the other hand, the "narrowed portion" at the tip end of the suspension disclosed in Japanese Patent Application Laid-Open No. Hei 5-303730 reduces the rigidity in the seeking direction.

Furthermore, in comparison with the above-described air floating type slider (hereinafter simply referred to as "floating type slider"), a contact type slider disclosed in Japanese Patent Application Laid-Open No. Hei 6-162445 is highly likely to be affected particularly by a difference in rigidity in the seeking direction since it is brought into direct contact with the medium to generate larger frictional forces. In other words, the rigidity in the seeking direction brings about the more strain (i.e., the flexure of the suspension).

SUMMARY OF THE INVENTION

In order to overcome the defects inherent in the prior art, an object of the present invention is to provide a magnetic head supporting device in which a change in rigidity of a suspension in the case where the suspension is located inside and outside above the surface of a magnetic disk is reduced, thereby suppressing a flexure of the suspension member to effectively suppress the generation of frictional forces, head crashes and the like.

According to the present invention, there is provided a magnetic head supporting device comprising:

a suspension member provided at a first end portion with a slider for a magnetic head and composed of a spring member;

a magnetic head arm for holding the other end portion of the suspension member; and a linear actuator for biasing the first end portion of the suspension member through the magnetic head arm to be reciprocatingly moved toward a central portion of a magnetic disk above the surface of the magnetic disk;

wherein an elongated hole having a predetermined width is provided on a centerline that connects the first end portion and the other end portion of the suspension member.

With such a structure, according to the present invention, in comparison with the prior art, the elongated hole formed in the same direction as the movement direction of the suspension works on the suspension to thereby reduce the change in rigidity of the suspension in the case where the suspension is located inside and outside above the surface of the magnetic disk (variation suppressing effect). Thus, the flexure of the suspension may be effectively reduced, and the generation of the frictional forces and head crashes caused by the flexure may be effectively suppressed.

According to another aspect of the invention, there is provided a magnetic head supporting device comprising:

a suspension member provided at a first end portion with a slider for a magnetic head and composed of a spring member;

a magnetic head arm for holding the other end portion of the suspension member; and a rotary actuator for biasing the suspension member through the magnetic head arm to be reciprocatingly rotated along the surface of the magnetic disk;

wherein at least one arcuate elongated hole having a radius of curvature having a pivot point about a rotary center of the rotary actuator is formed in the first end portion of the suspension member.

With such a structure, according to the present invention, in the same manner as described above, the arcuate elongated hole formed in the suspension works on the suspension to thereby reduce the change in rigidity of the suspension in the case where the suspension is located inside and outside above the surface of the magnetic disk (variation suppressing effect). Thus, the flexure of the suspension may be effectively reduced, and the generation of the frictional forces and head crashes caused by the flexure may be effectively suppressed.

In the magnetic head supporting device according to the invention, the arcuate elongated holes are two elongated holes having different radii of curvature.

In the magnetic head supporting device according to the invention, a pressure load of the slider against the surface of the magnetic disk is set at 1 gf or less.

In the magnetic head supporting device according to the invention, the slider is of a contact type which is in contact with the surface of the magnetic disk.

BRIEF DESCRIPTION OF THE DRAWINGS

The novel features believed characteristics of the invention are set forth in the appended claims. The invention itself, however, as well as other features and advantages thereof, will be best understood by reference to the detailed description which follows, and read in conduction with accompanying drawings, wherein:

DESCRIPTION OF THE PREFERRED EMBODIMENTS

Figure 1:
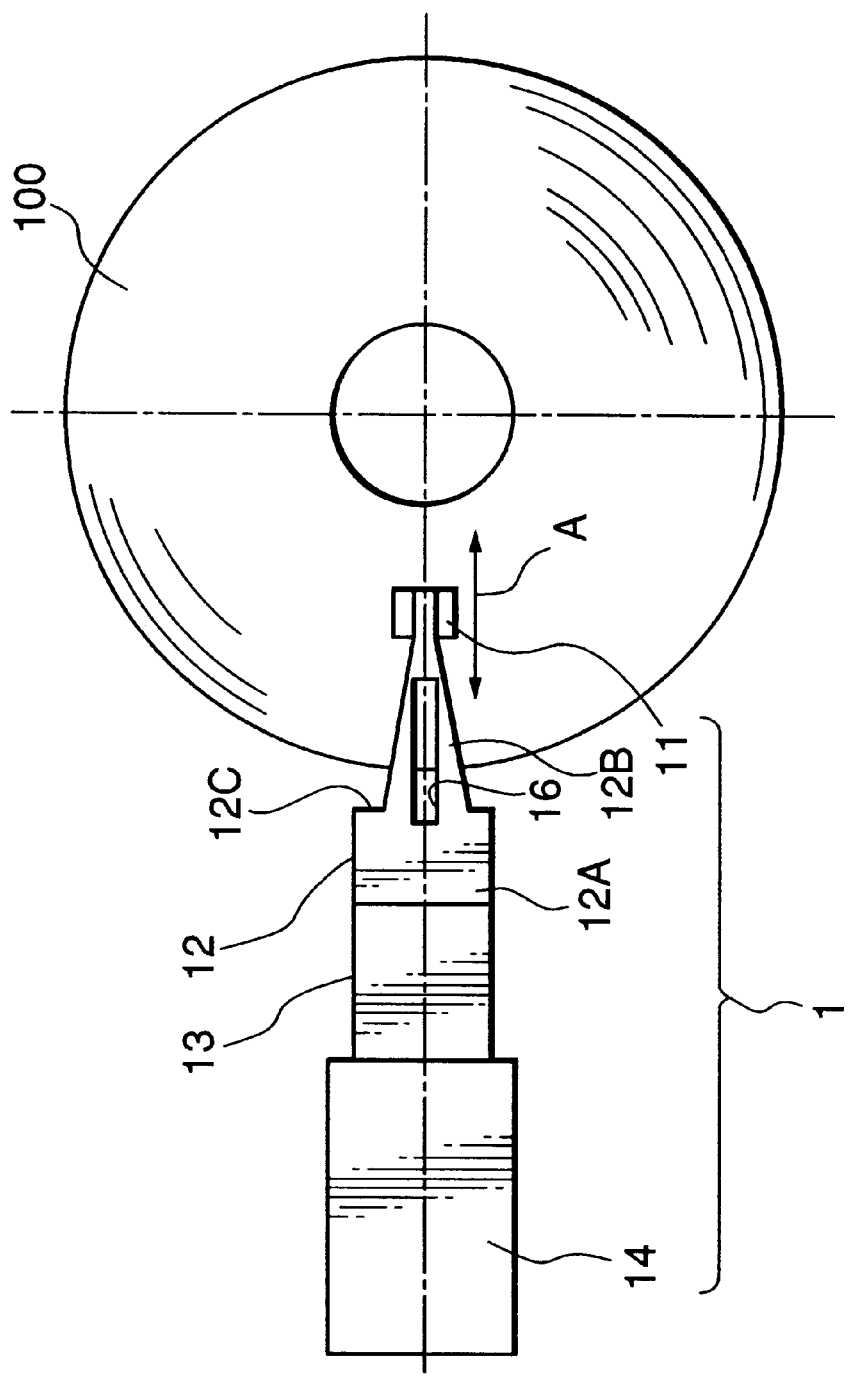
FIG. 1 is a schematic plan view showing a first embodiment of the present invention.

A first embodiment of the present invention will now be described with reference to FIGS. 1 to 4.

A magnetic head supporting device 1 is provided with a suspension member 12 provided at a first end with a slider 11 for a magnetic head and composed of a spring member, a magnetic head arm 13 for holding the other end of the suspension member 12, and a linear actuator 14 for biasing the first end of the above-described suspension member 12 through the magnetic head arm 13 to be reciprocatingly moved toward the central portion of a magnetic disk 100 above the surface of the magnetic disk 100.

Then, the linear actuator 14 operates to thereby cause the slider 11 for the magnetic head disposed above the magnetic disk 100 to reciprocatingly move from the inside to the outside or from the outside to the inside in the radial direction of the magnetic disk 100.

The suspension member 12 has a parallel width region 12A on the magnetic head arm 13 side and a width changing region 12B whose width is progressively decreased from its central portion to the tip end. The slider 11 for the magnetic head is mounted at the tip end portion of the width changing region 12B. Further, stepped portions 12C are formed on both sides of the boundary portion between the parallel width region 12A and the width changing region 12B of the suspension member 12. The suspension member 12 including the stepped portions 12C is formed to have a suitable spring effect as a whole.

Also, an elongated hole 16 having a predetermined width is formed on a centerline that connects one end portion (tip end portion) and the other end portion (rear end portion) of the suspension member 12 to each other. Then, the above-described slider 11 is reciprocatingly moved from the inside to the outside or from the outside to the inside in the radial direction of the magnetic disk 100 (refer to the arrow A in FIG. 1). In this case, the above-described elongated hole 16 is formed on the moving centerline upon the projection operation and the retraction operation in the longitudinal direction of the suspension member 12.

Figure 2:
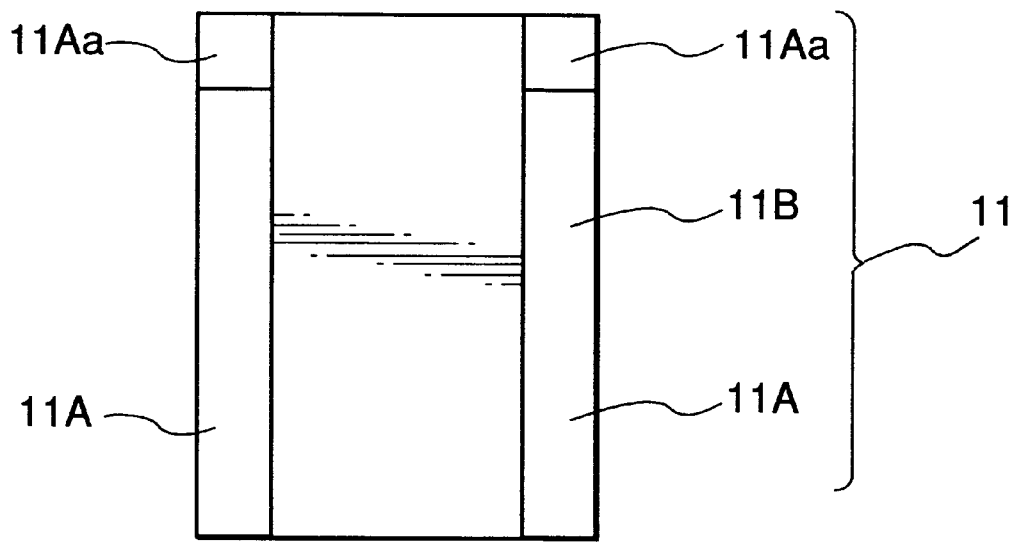
FIG. 2 is an illustration of a floating type slider provided in the first embodiment shown in FIG. 1.

FIG. 2 shows an example of the slider 11 provided in the system shown in FIG. 1 and shows a shape of the medium facing surface of the floating type magnetic head slider. In this case, floating surfaces 11A have slanted surfaces 11A$a$ at one end portion (air introduction side). A recess surface 11B is formed by machine cutting to be retracted by about 10 $\mu$m from the air floating surfaces 11A.

Figure 3:
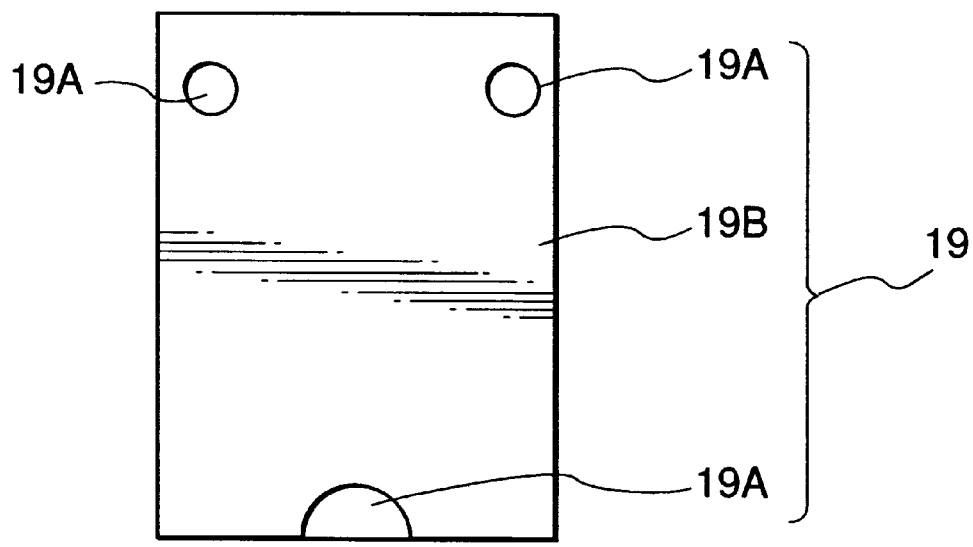
FIG. 3 is an illustration of a contact type slider provided in the first embodiment shown in FIG. 1.

FIG. 3 shows another example, referenced by numeral 19, of the slider 11 and shows a shape of the medium facing surface of the contact type magnetic head slider. In this case, the contact surface 19A is composed of three projecting surfaces and the recess surface 19B is formed by ion etching to be retracted by about 6 $\mu$m from the contact surfaces.

Figure 4:
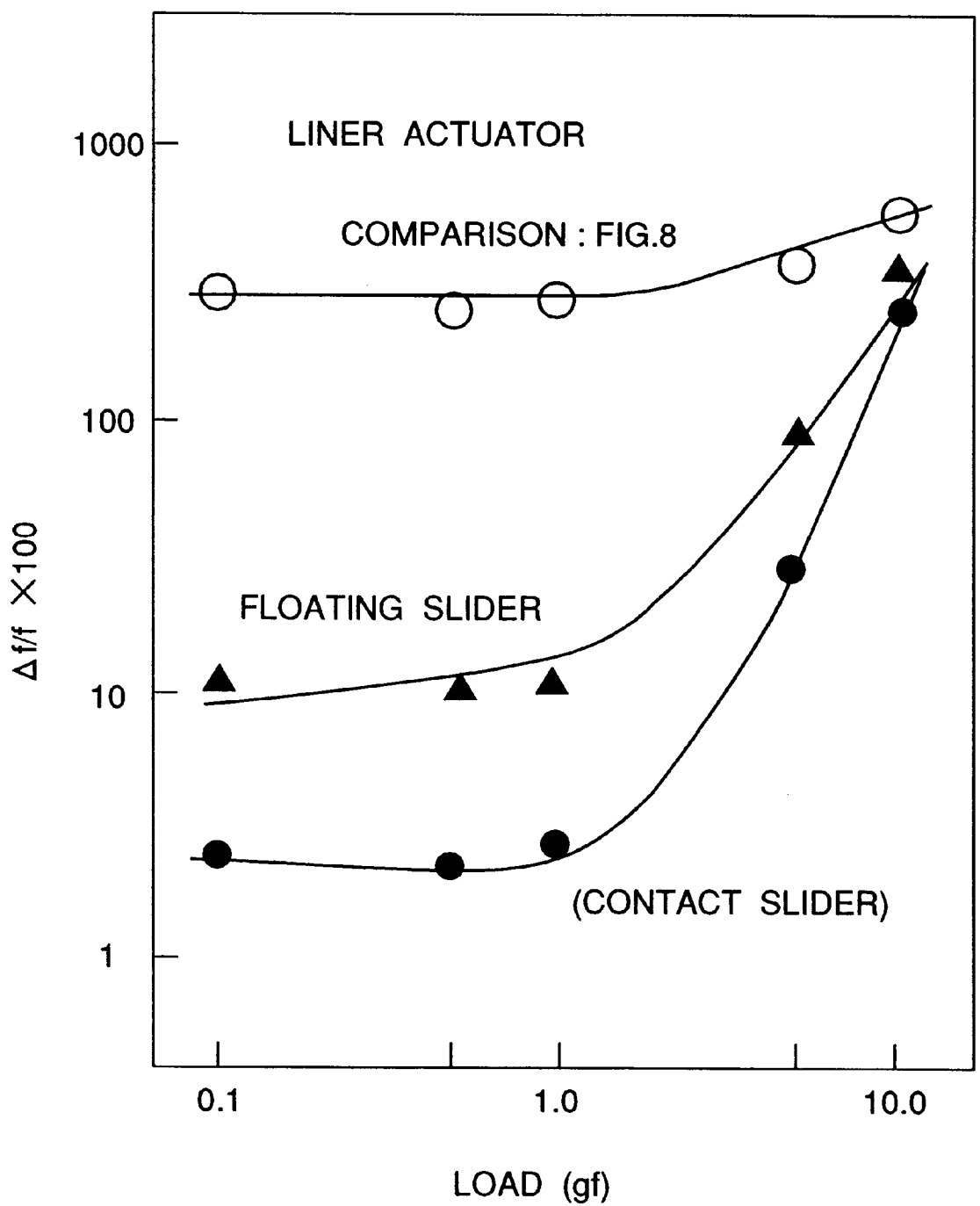
FIG. 4 is a graph showing an experimental example of the embodiment shown in FIG. 1 and showing a change in rigidity of a suspension member in the cases where the suspension member is located inside and outside above a surface of a magnetic disk.

Subsequently, in the embodiment shown in FIG. 1, in the case where the suspension member 12 was protruded in the seeking direction in the positional range of the radius 30 to 90 (mm) of the magnetic disk (medium) 100, the change $\Delta$f of a resonance frequency f was measured, and a ratio of the change to the static resonance frequency f ($\Delta$f/f$\times$100%) was inspected. The result is shown in FIG. 4. In this case, as a matter of course, the smaller the change rate $\Delta$f/f of the resonance frequency, the higher the rigidity in the seeking direction will become and the smaller the change in flexure of the suspension member 12 will become.

Figure 8:
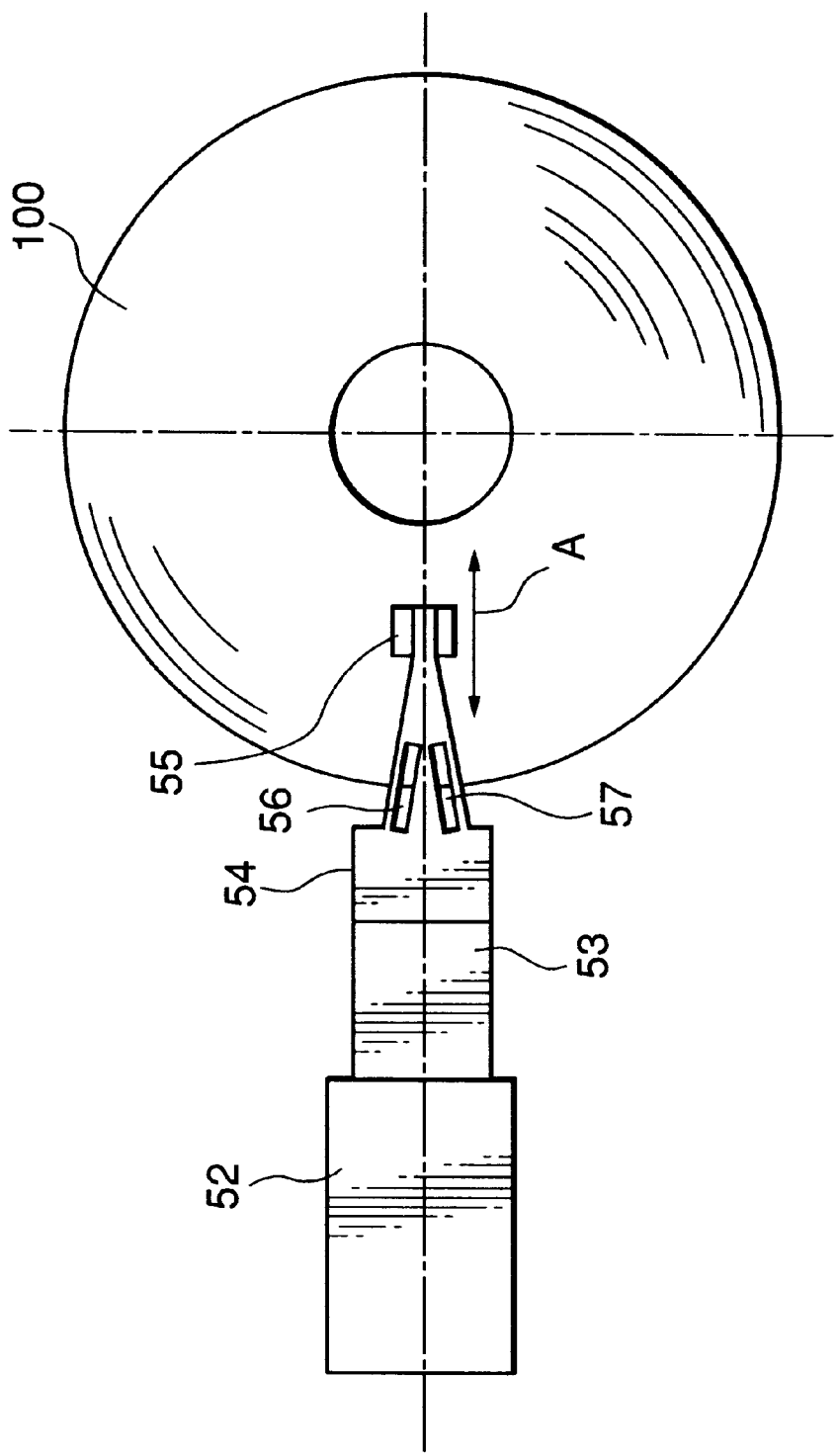
FIG. 8 is a plan view showing the prior art.

In FIG. 4, the comparison example was the prior art system shown in FIG. 8. In the case of the floating type slider, the system was provided with the slider shown in FIG. 2, and in the case of the contact type slider, the system was provided with the slider shown in FIG. 3. Then, as was apparent from FIG. 4, in comparison with the comparison example (in the case of FIG. 8), it was confirmed that the remarkable change suppression effect was experienced in both floating and contact type sliders 11 and 19. It was found that the smaller the load, the more remarkable the change suppression effect will become in particular in the range of 1 gf or less. Also, it was found that the change suppression effect was more remarkable with the contact type slider than the floating type slider.

A second embodiment of the present invention will now be described with reference to FIGS. 5 and 6.

A magnetic head supporting device 2 is provided with a suspension member 22 provided at a first end with a slider 21 for a magnetic head and composed of a spring member, a magnetic head arm 23 for holding the other end of the suspension member 22, and a rotary actuator 24 for biasing the first end of the above-described suspension member 22 through the magnetic head arm 23 to be reciprocatingly rotated toward the central portion of a magnetic disk 100 above the surface of the magnetic disk 100. Then, in general, as shown in FIG. 5, the slider 21 may take the reciprocating rotary movement along the radius of the magnetic disk 100.

Then, two arcuate elongated holes 26 and 27 having different radii of curvature about a pivot point as a rotary center of the above-described actuator 24 are provided at the first end portion side of the suspension member 22.

Figure 5:
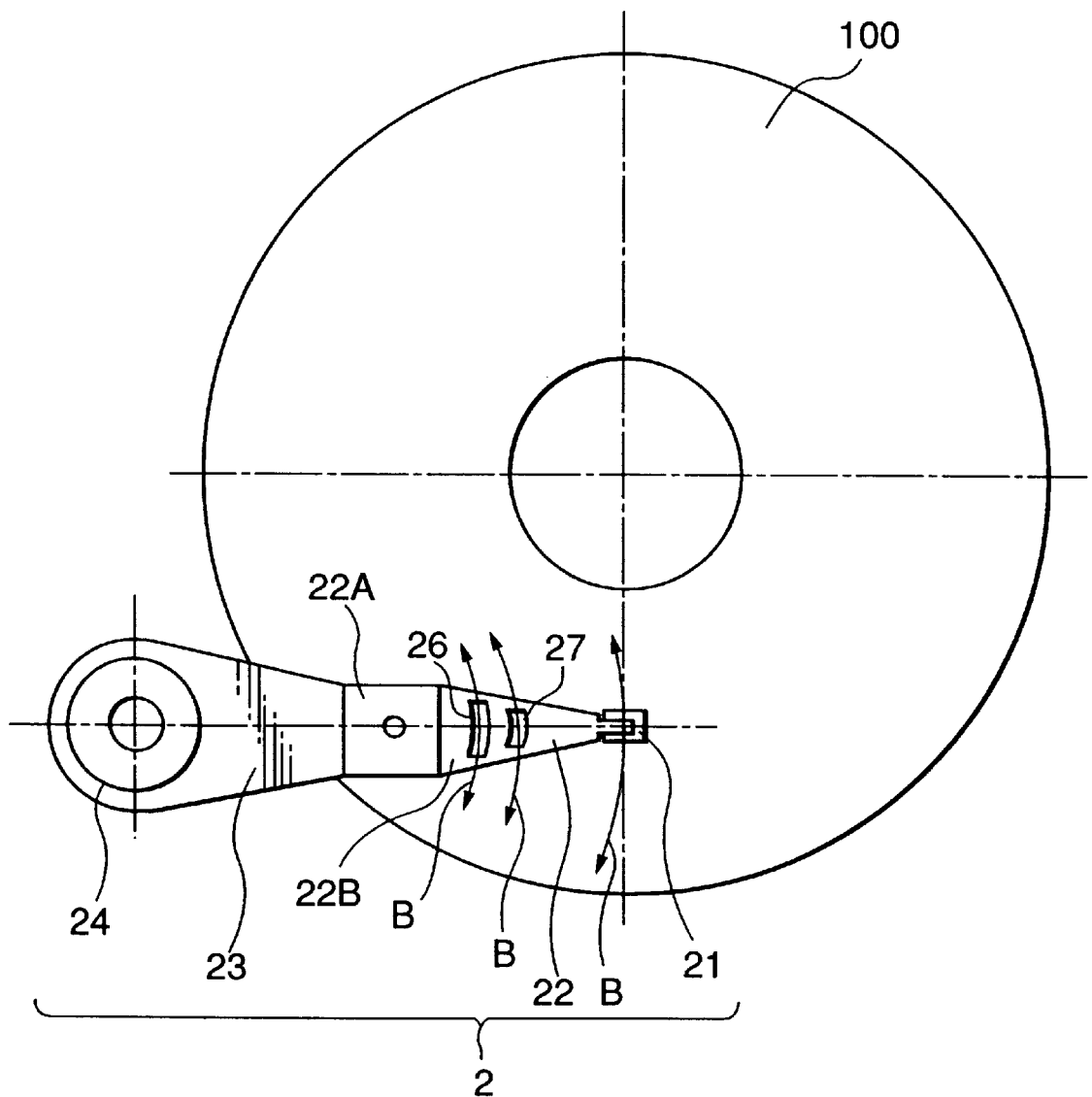
FIG. 5 is a schematic plan view showing a second embodiment of the present invention.

Then, the rotary actuator 24 operates to thereby cause the slider 21 for the magnetic head disposed above the magnetic disk 100 to reciprocatingly move from the inside to the outside or from the outside to the inside in the radial direction of the magnetic disk 100 (refer to the arrow B in FIG. 5). For this reason, the rotary actuator 24 is arranged in the vicinity of the magnetic disk 100.

The suspension member 22 has a parallel width region 22A on the magnetic head arm 23 side and a width changing region 22B whose width is progressively decreased from its central portion to the tip end. The slider 21 for the magnetic head is mounted at the tip end portion of the width changing region 22B. The suspension member 22 is formed to have a suitable spring effect as a whole.

The other structure is the same as that of the first embodiment shown in FIG. 1.

Subsequently, in the embodiment shown in FIG. 5, in the case where the suspension member 22 was rotationally moved in the seeking direction in the positional range of the radius 30 to 90 (mm) of the magnetic disk (medium) 100, the change $\Delta f$ of a resonance frequency f was measured, and a ratio of the change to the static resonance frequency f ($\Delta f/f \times 100\%$) was inspected. The result is shown in FIG. 6. In this case, as a matter of course, the smaller the change rate $\Delta f/f$ of the resonance frequency, the higher the rigidity in the seeking direction will become and the smaller the change in flexure of the suspension member 22 will become.

Figure 6:
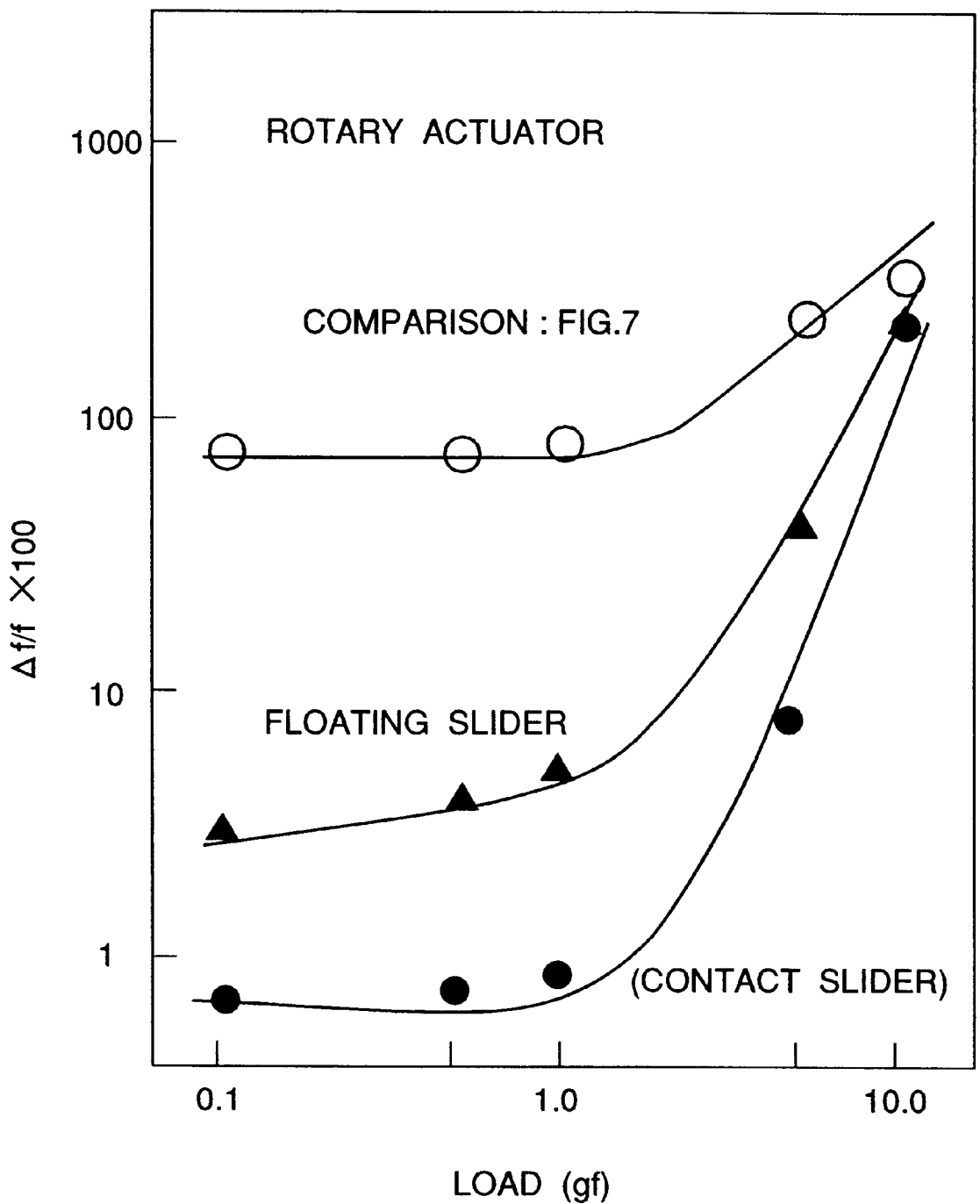
FIG. 6 is a graph showing an experimental example of the embodiment shown in FIG. 5 and showing a change in rigidity of a suspension member in the cases where the suspension member is located inside and outside above a surface of a magnetic disk.
Figure 7:
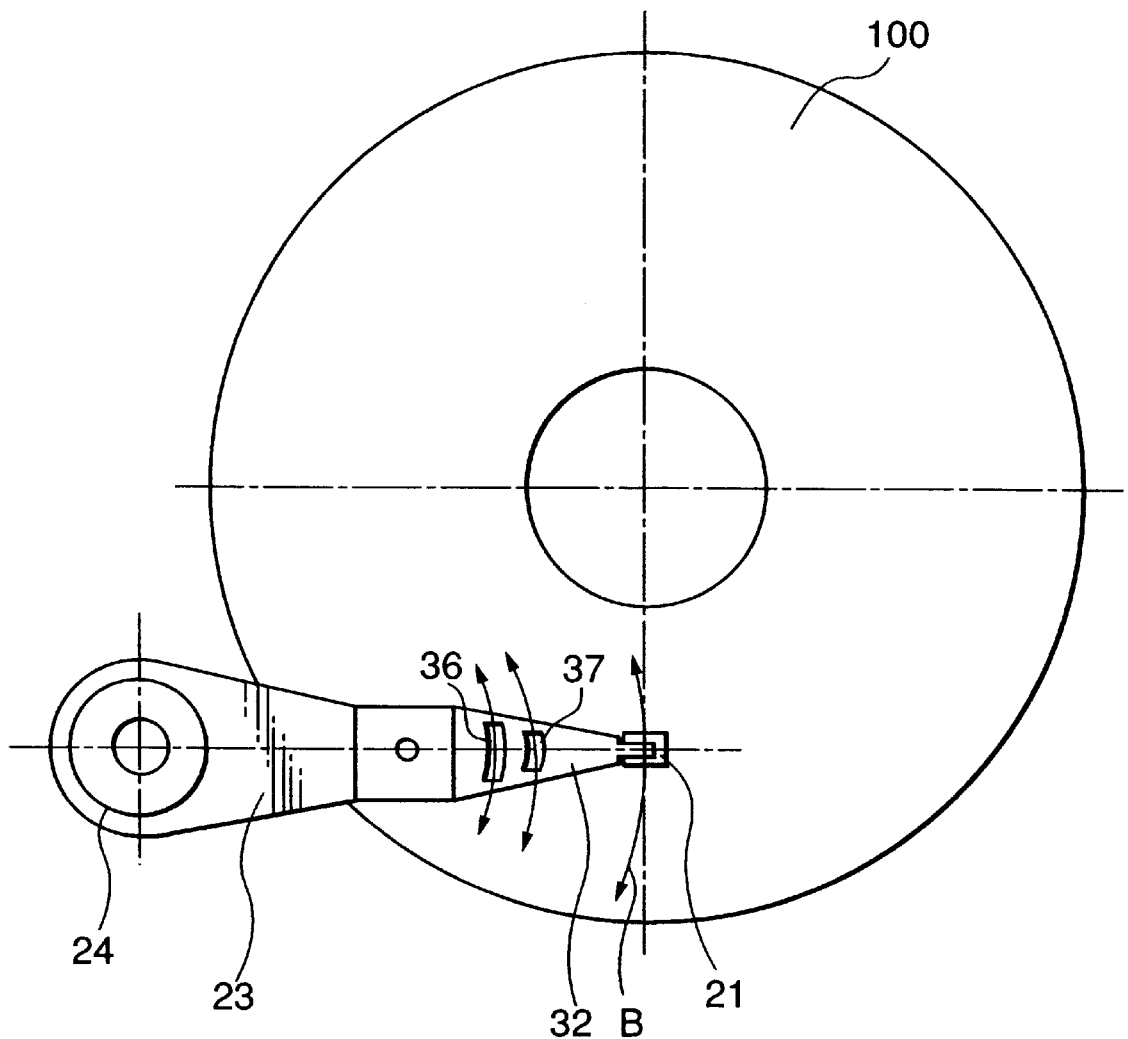
FIG. 7 is a schematic plan view showing a comparison example used in the experimental example of the embodiment shown in FIG. 6.

In FIG. 6, the comparison example was the prior art system shown in FIG. 7. In the suspension member 32 shown in FIG. 7, linear (rectangular) elongated holes 36 and 37 are formed at the same positions of the above-described arcuate elongated holes 26 and 27 in FIG. 5. The comparison example shown in FIG. 7 is shown for inspecting the functions of the elongated holes 26 and 27. Accordingly, the other structure thereof is the same as that shown in FIG. 5.

Then, as was apparent from FIG. 6, in comparison with the comparison example (in the case of FIG. 7), it was confirmed that the remarkable change suppression effect was observed in both floating and contact type sliders 11 and 19. It was found that the smaller the load, the more remarkable the change suppression effect would become in particular in the range of 1 gf or less. Also, it was found that the change suppression effect was more remarkable with the contact type slider than the floating type slider.

Furthermore, with respect to the comparison example, the improvement in the case of using the rotary actuator (FIG. 6) was more remarkable than that in the case of use of the linear actuator (FIG. 4).

Thus, in the respective embodiments, it was found that the change suppression effect was more remarkable in both the floating type and contact type sliders than the comparison examples. Also, it was found that the smaller the load, the more remarkable the suppression effect would become in particular in the range of 1 gf or less, and it was more remarkable with the contact type slider than the floating type slider.

As a result of the measurement of the positional error in the above-described embodiments, in any case, it was possible to decrease the positional error within 50 nm. However, the positional error was not smaller than 1 $\mu$m with the conventional magnetic head supporting device. Furthermore, upon the seeking operation with the positional precision of 100 nm, in the conventional system, there were many recording/reproducing errors. For this reason, it was difficult to practically use this system. However, in the above-described respective embodiments, there was no fear that the recording/reproducing error would occur or the cancellation of record would occur due to the wear of the magnetic head or the medium.

Incidentally, if any other components have the same function as that of the elongated holes 16, or 26 and 27 formed in the suspension members 12 and 22, for example, grooves or projections may be used instead thereof.

The present invention is applied with the foregoing structure and function as described above. According to the present invention, it is therefore possible to reduce the change in rigidity of the suspension when the suspension is located inside and outside above the surface of the magnetic disk by the effect of the elongated holes having the predetermined shape formed in the suspension. Thus, it is possible to effectively suppress the flexure of the suspension member. At the same time, it is possible to effectively suppress the increase of the frictional force, the head crash or the like caused by the flexure. Accordingly, it is possible to provide an excellent magnetic head supporting device that may enhance the reliability of the magnetic disk apparatus provided with the suspension unlike the prior art.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A magnetic head supporting device comprising:

a suspension member provided at a first end portion with a slider for a magnetic head and composed of a spring member;

a magnetic head arm for holding the other end portion of said suspension member; and a rotary actuator for biasing said suspension member through said magnetic head arm to be rotated about a rotary center of said rotary actuator along the surface of a magnetic disk;

wherein at least one elongated hole having an arcuate side with a radius of curvature whose center is at the rotary center of said rotary actuator is formed in the first end portion of said suspension member.

2. The magnetic head supporting device according to claim 1, wherein said elongated hole has two substantially parallel arcuate sides.

3. The magnetic head supporting device according to claim 1, comprising two of said elongated holes having different radii of curvature.

4. The magnetic head supporting device according to claim 1, wherein a pressure load of said slider against the surface of the magnetic disk is set at 1 gf or less.

5. The magnetic head supporting device according to claim 1, wherein said slider is of a contact type which is in contact with the surface of the magnetic disk.

* * * * *